US012759701B1

(12) United States Patent
Tzeng

(10) Patent No.: US 12,759,701 B1
(45) Date of Patent: Oct. 13, 2026

(54) VTOL VEHICLE

(71) Applicant: NewSemi Technology Co., Ltd., New Taipei City (TW)

(72) Inventor: Yih-Wei Tzeng, New Taipei City (TW)

(73) Assignee: NewSemi Technology Co., Ltd., New Taipei City (TW)

( * ) Notice: Subject to any disclaimer, the term of this patent is extended or adjusted under 35 U.S.C. 154(b) by 0 days.

(21) Appl. No.: 19/308,778

(22) Filed: Aug. 25, 2025

(51) Int. Cl.
*B64C 29/00* (2006.01)
*B64C 3/56* (2006.01)

(52) U.S. Cl.
CPC ............ *B64C 29/0025* (2013.01); *B64C 3/56* (2013.01)

(58) Field of Classification Search
CPC .............................. B64C 29/0025; B64C 3/56
See application file for complete search history.

(56) References Cited

U.S. PATENT DOCUMENTS 2,910,254 A * 10/1959 Razak ..................... B64C 23/00 244/45 R
3,065,933 A 11/1962 Williams
4,125,232 A * 11/1978 MacLean ............ B64C 29/0025 244/12.3
D304,821 S * 11/1989 Ratony ......................... D12/319
6,848,649 B2 * 2/2005 Churchman ........ B64C 29/0025 244/45 R
8,220,737 B2 * 7/2012 Wood ..................... B64U 30/24 244/45 R
11,167,845 B2 11/2021 Schank
12,214,874 B2 2/2025 Shaanan
2023/0294826 A1 9/2023 Tian

FOREIGN PATENT DOCUMENTS

EP 3369652 A1 5/2018
GB 2555440 A * 5/2018 ............. B64D 35/04
WO WO-2021138470 A1 * 7/2021 ............. B64C 39/08

* cited by examiner

*Primary Examiner* — Justin M Benedik
(74) *Attorney, Agent, or Firm* — MUNCY, GEISSLER, OLDS & LOWE, P.C.

(57) ABSTRACT

A VTOL (vertical takeoff and landing) vehicle is provided, which includes a cabin, a lifting part, and a cruise wing. The lifting part is connected to and disposed on a top of the cabin and is configured to generate a lifting force during takeoff or landing of the VTOL vehicle. The cruise wing is connected to and disposed above the lifting part and is configured to provide a lifting force to sustain the VTOL vehicle in the air in level flight.

11 Claims, 2 Drawing Sheets

VTOL VEHICLE

FIELD OF THE INVENTION

The present invention relates to a vehicle, particularly relates to a vertical take-off and landing vehicle.

BACKGROUND OF THE INVENTION

According to the mode of takeoff and landing, existing aircraft can be categorized into non-vertical takeoff and landing (non-VTOL) and vertical takeoff and landing (VTOL) types. Non-VTOL aircraft generally require a sufficiently long and wide runway to enable taxiing for takeoff or landing. VTOL aircraft can be further classified into helicopters, hybrid rotorcraft, and tiltrotor aircraft.

While various VTOL aircraft have been developed, each existing type suffers from inherent limitations. Helicopters are constrained by low forward-flight efficiency, low maximum cruising speed, and high noise levels, as well as high energy consumption due to the continuous rotation of their rotors during flight. Hybrid rotorcrafts, although combining the vertical lift capability of copters with the aerodynamic efficiency of fixed wings, require large wingspans, which demand substantial storage and operating space. Tiltrotor aircraft offers both vertical takeoff and high-speed forward flights; however, their tilting mechanisms involve complex control systems, leading to high manufacturing and maintenance costs, reduced flight stability, and limited operational reliability.

In publicly available or published patents, various configurations of such aircraft have been disclosed. For example, U.S. Pat. No. 3,065,933 discloses a helicopter equipped with a main rotor for lift and a tail rotor for anti-torque control. While capable of vertical takeoff and landing, the helicopter exhibits low forward-flight efficiency, limited maximum speed, high noise during cruising, and high energy consumption due to the continuous rotor operation.

U.S. Pat. No. 12,214,874 describes a hybrid rotorcraft combining a rotor system with fixed wings to enhance forward-flight performance. However, the extended wingspan requires a larger storage and operation space, and efficiency decreases under high payload or maximum takeoff weight.

European Patent Publication No. EP 3,369,652 discloses a hybrid rotorcraft with both rotary and fixed lifting surfaces. Although it improves aerodynamic efficiency, its large structural components increase overall size and reduce operational flexibility in confined spaces.

U.S. Pat. No. 11,167,845 describes a tiltrotor aircraft capable of both vertical takeoff and high-speed forward flight by tilting its rotor assemblies. Nevertheless, the tilting mechanism requires a complex control system, resulting in high manufacturing and maintenance costs, reduced flight stability, and lower operational reliability.

U.S. Patent Publication No. US 2023/0294826 also relates to a VTOL aircraft with tiltable propulsion units. While offering versatile flight modes, it inherits similar drawbacks of tiltrotor configurations, such as structural complexity, high cost, and limited reliability under certain operating conditions.

In summary, although the above-mentioned aircraft configurations are capable of vertical takeoff and landing or improved forward-flight performance, they still have respective drawbacks. These include structural complexity and high manufacturing cost; large size or wingspan requiring spacious storage and operating areas; high energy consumption and low aerodynamic efficiency during certain flight phases; increased mechanical and control system complexity leading to greater maintenance demands; and reduced flight stability or reliability under specific operating conditions. Such limitations hinder adaptability in compact operational environments, reduce cost-effectiveness, and limit their practical application.

SUMMARY OF THE INVENTION

According to the above-mentioned drawbacks of the conventional prior art, there remains a need for a VTOL (vertical takeoff and landing) vehicle that overcomes these drawbacks while maintaining high flight efficiency, stability, and operational reliability.

The objective of the present invention is to provide a vertical takeoff and landing vehicle that is relatively small in size and configured as a rotorcraft capable of vertical takeoff and landing without requiring a runway. The VTOL vehicle of the present invention offers high flight efficiency, high payload capacity, and simple yet effective structure, thereby enabling improved cost effectiveness and ease of control.

According to the objective, the present invention provides a VTOL vehicle comprising a cabin, a lifting part, and two cruise wings. The lifting part is connected to and disposed on a top of the cabin and is configured to accommodate a rotor assembly for generating an upward lifting force that enables the VTOL vehicle to ascend or descend vertically. The two cruise wings are connected to and disposed on a top of the lifting part and are configured to provide a lifting force to sustain the VTOL vehicle in the air in level flight.

According to the above objective, the present invention also provides a VTOL vehicle, which includes a cabin, a lifting part, and two cruise wings. The cabin is configured to accommodate occupants and/or cargo. The lifting part is connected to and disposed on a top of the cabin. The lifting part includes a rotor assembly, and the rotor assembly is configured to generate vertical lift to drive ascent and descent of the VTOL vehicle in a vertical takeoff and landing mode. The cruise wing is disposed on and connected to the lifting part and is configured to provide lifting force and maintain flight stability in a horizontal flight mode.

DETAILED DESCRIPTION OF THE PREFERRED EMBODIMENT

Figure 1:
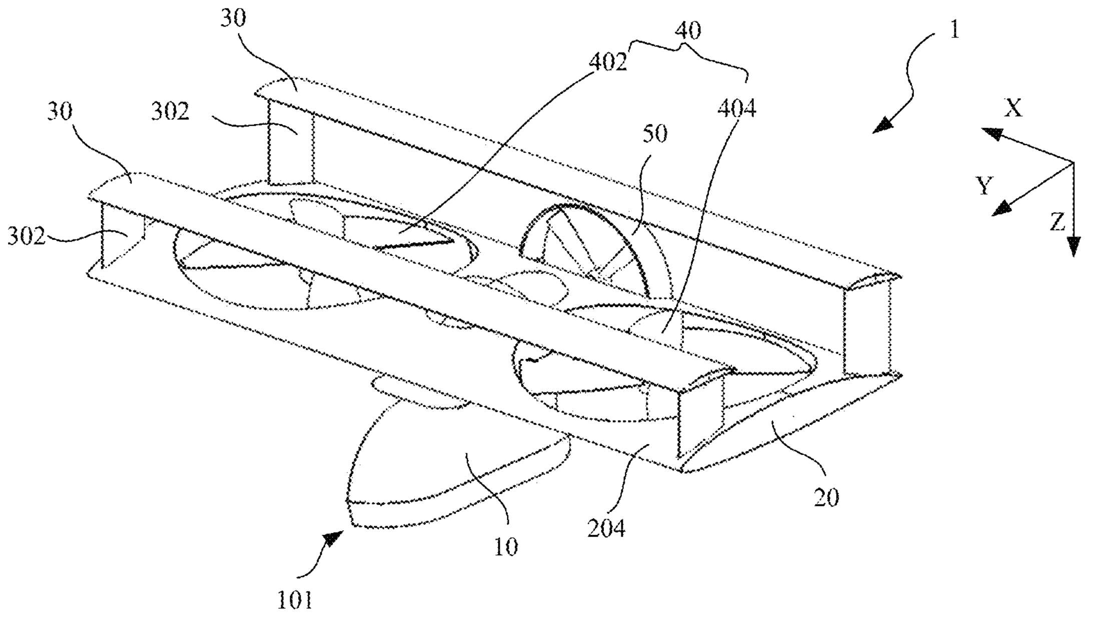
FIG. 1 is a schematic diagram showing a structure of vertical takeoff and landing vehicle in accordance with this invention.
Figure 2:
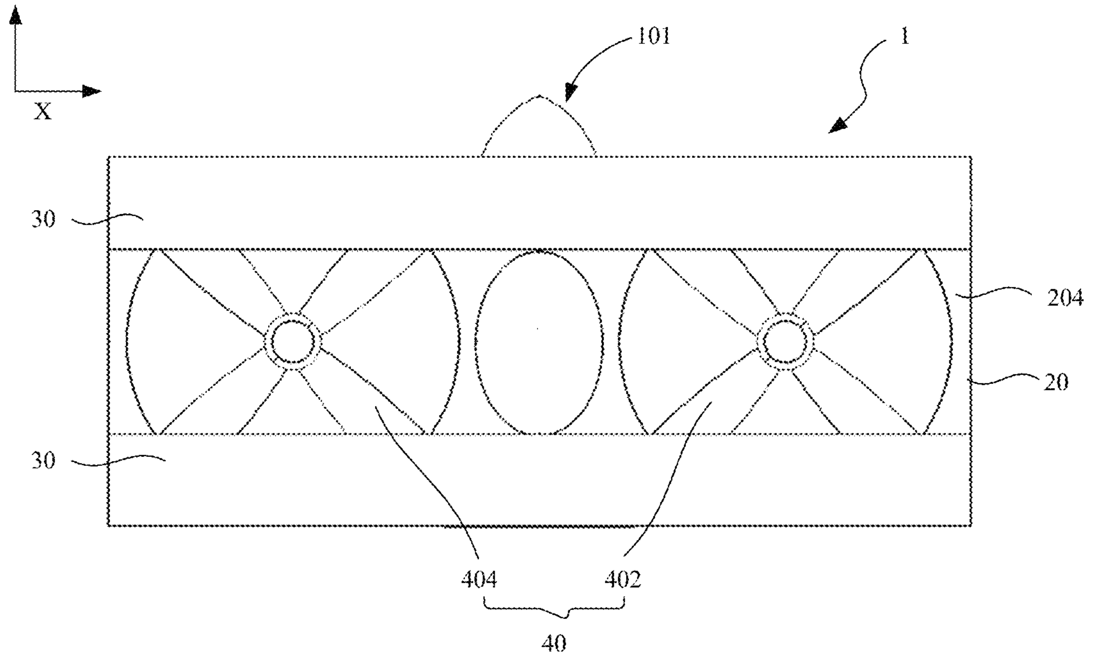
FIG. 2 is a top view showing the structure of vertical takeoff and landing vehicle in accordance with this invention.
Figure 3:
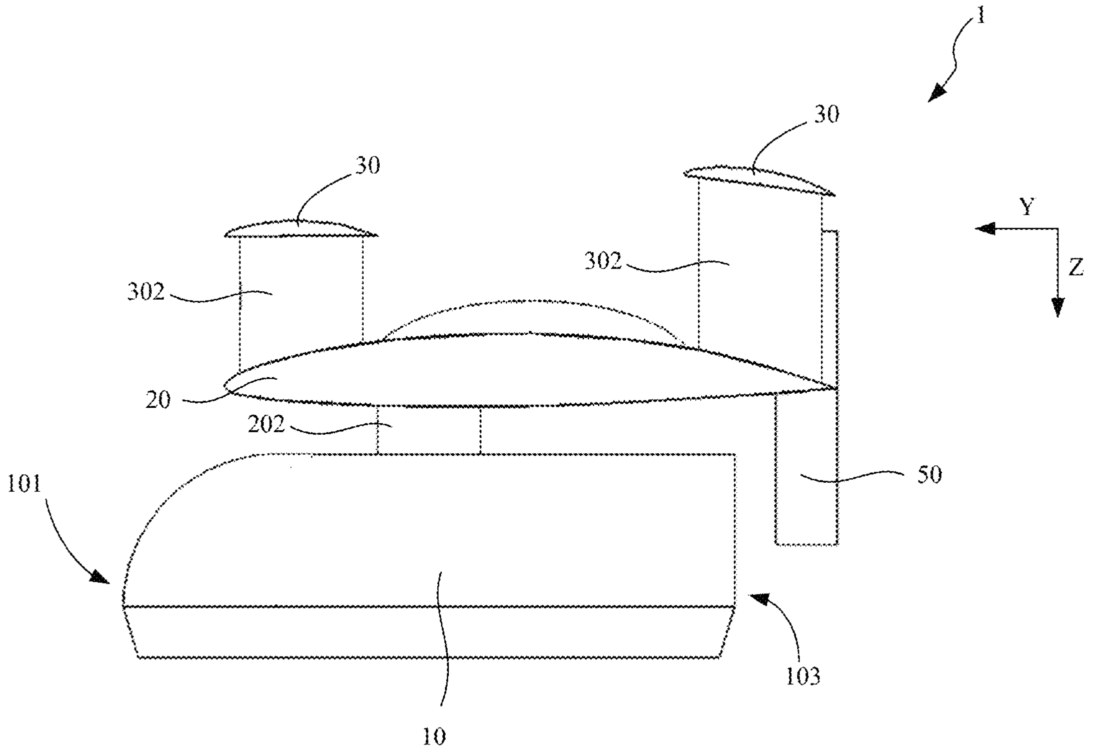
FIG. 3 is a side view showing the structure of vertical takeoff and landing vehicle in accordance with this invention.

Please refer to FIGS. 1-3. FIG. 1 is a schematic diagram showing the structure of vertical takeoff and landing (VTOL) vehicle of the first embodiment of this invention. FIG. 2 is a top view showing a structure of VTOL vehicle of the present invention, and FIG. 3 is a side view showing the structure of VTOL vehicle of the first embodiment of this invention.

First, it should be noted that the VTOL vehicle of the present invention may be manned or unmanned. The VTOL vehicle 1 includes a cabin 10, a lifting part 20, and two cruise wings 30. The lifting part 20 is connected to and disposed on a top of the cabin 10. The two cruise wings 30 are connected to and disposed on the top of a lifting part 20 and are configured to provide a lifting force to sustain the VTOL vehicle 1 in level flight.

The cabin 10 may include a cockpit, a passenger compartment, or a cargo bay, and may be configured to accommodate occupants and/or cargo or other types of payloads, without limitation. In one embodiment, the cabin 10 is aerodynamically shaped to reduce drag during horizontal flight; however, the size and shape of the cabin 10 are not limited in the present invention.

The lifting part 20 includes a rotor assembly 40 and a fairing housing assembly 204, wherein the rotor assembly 40 is disposed within the fairing housing assembly 204. Accordingly, the rotor assembly 40 is positioned above the cabin 10, entirely enclosed within the fairing housing assembly 204 of the lifting part 20, and oriented substantially parallel to the horizontal plane. In one embodiment of this invention, the rotor assembly 40 includes at least two rotors 402 and 404 disposed symmetrically on opposite sides above the cabin. Each of the rotors 402 and 404 includes at least two blades, three blades or more. The number and shape of the blades are not limited in the present invention.

In one embodiment, the lifting part 20 has a rectangular shape, a trapezoidal shape, or any other suitable shape, and is not limited in the present invention. For example, when the lifting part 20 has a rectangular shape, the width of the lifting part 20 is greater than the width of the cabin 10, and the width of the lifting part 20 is greater than the length of the lifting part 20.

In addition, the lifting part 20 is connected to the top of the cabin 10 via a connecting component 202, which may be fixedly or removably engaged with the top of the cabin 10. However, the engagement manner between the cabin 10 and the lifting part 20 is not limited to any particular form in the present invention.

In this embodiment, the number of cruise wing 30 are two. The two cruise wings 30 respectively disposed on opposite sides of the lifting part 20. Specifically, each cruise wing 30 is mounted along a longitudinal side (X direction) of the lifting part 20, such that the structure of the VTOL vehicle 1 from the cabin 10 upward includes the cabin 10, the lifting part 20 (which includes rotor assembly 40), and the cruise wings 30. However, number of cruise wings 30 is not limited in the present invention.

In various embodiments, the two cruise wings 30 may be foldable, retractable, fixed, variable-angle, or deployable on the top of the lifting part 20. The two cruise wings 30 may be configured to fold or retract on or within the lifting part 20 when not in use.

The two cruise wings 30 may be mounted on the top of the lifting part 20 via several connecting structures 302, which may be fixedly or removably engaged with the top of the lifting part 20. The connecting structure 302 may be arranged at the four corners on the top of the lifting part 20, or along its longitudinal sides (X direction), and their location, arrangement, and numbers are not limited in the present invention. In this embodiment, the connecting structure 302 is arranged at the four corners on the top of the lifting part 20.

In addition, the VTOL vehicle 1 may further include one or more propulsor 50, which may be disposed at one or both of a front end and a rear end of the cabin 10, at one or both of a front end and a rear end of the lifting part 20, or at one or both of the cabin 10 and the lifting part 20. The location, the arrangement, and number of the propulsors 50 are not limited in the present invention. In this embodiment, the propulsor 50 is disposed at the end of lifting part 20.

According to the foregoing, during vertical takeoff and landing, the rotor assembly 40 generates an upward lifting force that enables the VTOL vehicle 1 to ascend or descend vertically. The rotors 402 and 404 rotate to produce sufficient thrust to overcome the weight of VTOL vehicle 1, allowing stable and controlled vertical movement without requiring a runway. Once the VTOL vehicle 1 transitions to horizontal flight, the cruise wings 30 provides aerodynamic lift sustaining the VTOL vehicle 1 in the air in level flight. At this stage, the rotor assembly 40 ceases rotation for better efficiency, while the cruise wing 30 provides the primary lift necessary for cruising. The propulsor 50 provides the propulsion for the VTOL vehicle 1 to move forward, and depending on the design, may assist in maneuvering.

As described above, the VTOL vehicle 1 of the present invention offers several advantages. It has a relatively small size and is configured as a vehicle capable of vertical takeoff and landing without requiring a runway. This design provides high flight efficiency, a high payload capacity, and a simple yet effective structure, thereby enabling cost effectiveness and practicality.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A VTOL vehicle, comprising:

a cabin;

a lifting part disposed on a top of the cabin; and two cruise wings connected to the lifting part and disposed on opposite longitudinal sides of the lifting part along an X direction thereof and on a top thereof, the two cruise wings being configured to provide a lifting force to sustain the VTOL vehicle in the air in level flight.

2. The VTOL vehicle according to claim 1, wherein the lifting part comprises a rotor assembly and a fairing housing assembly, the rotor assembly being disposed within the fairing housing assembly and oriented parallel to a horizontal plane.

3. The VTOL vehicle according to claim 2, wherein the rotor assembly comprises at least two rotors disposed symmetrically on opposite sides above the cabin.

4. The VTOL vehicle according to claim 1, wherein a width of the lifting part is greater than a width of the cabin.

5. The VTOL vehicle according to claim 1, wherein the two cruise wings are fixed, foldable, or retractable on a top of the lifting part.

6. The VTOL vehicle according to claim 1, wherein the cabin comprises a cockpit, a passenger compartment, a cargo bay, or other types of payloads.

7. The VTOL vehicle according to claim 1, further comprising at least one propulsor, the propulsor being disposed at one or both of a front end and a rear end of the cabin, or at one or both of a front end and rear end of the lifting part, or at one or both of the cabin and the lifting part.

8. A VTOL vehicle, comprising:
- a cabin configured to accommodate occupants and/or cargo;
- a lifting part connected to and disposed on a top of the cabin; and
- two cruise wings connected to the lifting part and disposed on opposite longitudinal sides of the lifting part along an X direction thereof and on a top thereof, the two cruise wings being configured to provide lifting force and maintain flight stability in a horizontal flight mode.

9. The VTOL vehicle according to claim 8, wherein the cabin is aerodynamically shaped to reduce drag during horizontal flight.

10. The VTOL vehicle according to claim 8, wherein the two cruise wings are fixed wings, variable angle wings, or deployable wings.

11. The VTOL vehicle according to claim 8, wherein the two cruise wings are configured to fold or retract on or within the lifting part when not in use.

* * * * *